March 27, 1945. T. P. BACON, JR 2,372,246
INSIDE CURING RIM
Filed July 20, 1943

INVENTOR.
THOMAS P. BACON JR.
BY George B. White
Attorney.

Patented Mar. 27, 1945

2,372,246

UNITED STATES PATENT OFFICE 2,372,246

INSIDE CURING RIM

Thomas P. Bacon, Jr., Oakland, Calif.

Application July 20, 1943, Serial No. 495,408

5 Claims. (Cl. 18—18)

This invention relates to inside curing rims.

Inside curing rims heretofore used were so located within the tire casing that the inner tube, or pneumatic curing bag curled around the opposite sides of the rim periphery causing the doubling, cutting and creasing of the inner tube. This action also reduced the available outward expansion force for the pressing of the casing against the tread design of the mold. Difficulty was also experienced with the lack of quick and true alignment of the rim.

The object of this invention is to provide an inside curing rim of the collapsible type, which is so formed that the penumatic expansive force of the curing bag is directed mainly radially outwardly toward the tread portion of the tire casing and the lateral creeping, doubling or creasing of the inner tube in the casing is positively obviated.

Another object of this invention is to provide an inside curing rim which can be truly and quickly aligned and held firmly in aligned position in the tire without looseness of the hinged joints between the collapsible sections of the rim.

Another object of this invention is to provide an inside curing rim which is highly useful and simple in construction. Convenience of arrangement, lightness and comparative inexpense of manufacture are further objects which have been borne in mind in the production and development of the invention.

The invention is clearly illustrated in the accompanying drawing wherein.

Figure 1:
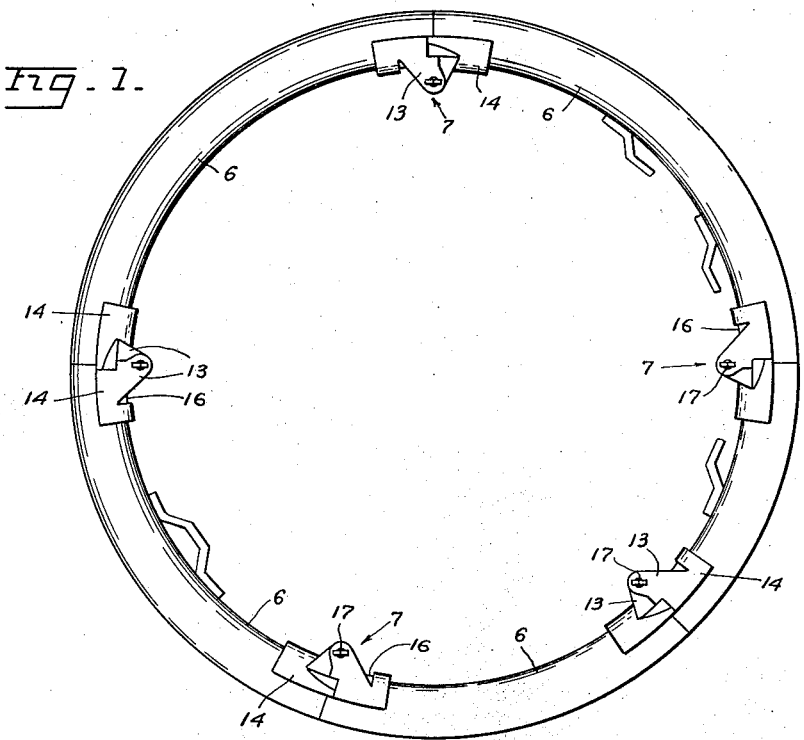
Fig. 1 is a side view of an inside curing rim constructed in accordance with my invention.
Figure 2:
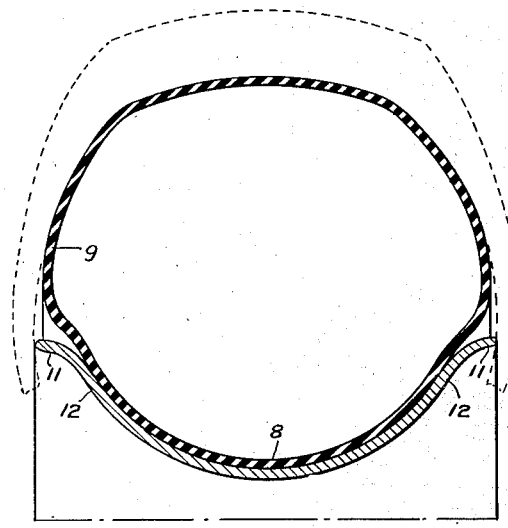
Fig. 2 is a cross sectional view of said inside curing rim in the tire casing.
Figure 3:
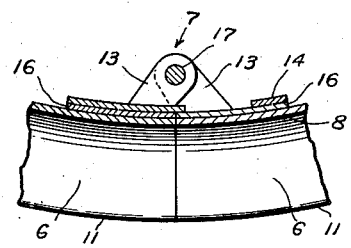
Fig. 3 is a sectional view of a joint of said inside curing rim.

In carrying out my invention I make use of a plurality of arcuate sections 6 connected to each other by hinged joints 7 which latter can be fastened against collapsing so as to hold the sections in circular rim assembly. The sections 6 complement each other to form a complete circle.

The rim sections are preferably formed of comparatively light material such as sheet metal.

The cross sectional shape of each rim section includes a dished central portion which has its bottom formed on an arc into a well 8 the width of which is narrower than the maximum width of the expanded curing bag 9 at the portion where it fits into the dished well 8 of the rim. Thus the inner peripheral portion of the curing bag 9 substantially completely fills the circumferential dished well 8 of the inside rim. The opposite circumferential edges 11 of the rim are flared outwardly and slightly upwardly on an outward curve substantially contiguous with the opposite outer portions 12 of the sides of the well 8. These side flanges 11 extend outwardly to a width somewhat beyond the maximum expanded width of bag 9 in the tire so that when the bag 9 is inflated in the rim it fills the well 8 and expands radially outwardly and spaced from the outer edges of the flanges 11 without curling thereover. The expanding force in the curing bag 9 is thus directed radially outwardly and is not wasted by any action or tendency for spreading or pushing the sides of the tire casing away from the outer flange edges of the rim.

Each hinged joint between adjacent rim sections includes a bracket 13 the base 14 of which is superimposed on a curved sub-base 16 both being integrally united together and with the inner surface of the rim section 6 adjacent said hinged ends of the respective sections. The sub-base 16 extends to the end of the section 6 so as to provide a firmer bearing end. The brackets 13 at one end of each section 6 are narrower than the bracket 13 at the other end so that the narrower bracket 13 fits between the bifurcated ends of the wider bracket 13. The brackets 13 at the opposite ends of each section extend outwardly beyond the ends of the respective sections 6 and have transverse holes 17 therein so that the adjacent brackets 13 of adjacent section ends overlap with the holes 17 therein in registry. A fastening element, such as a pin or the like, is inserted through the aligned bracket holes forming the fulcrums inwardly of the rim and in substantial registry with the line of abutment between the ends of the adjacent sections 6.

My sectional curing rim, by providing the relatively reduced area in the circumferential well, confines and directs the expansion of the curing bag to outward pressure on the tire tread; by the arrangement of outer flared flanges prevents the curling of the bag around the edges of the rim and thereby prevents waste of expansive force and the doubling, creasing and cutting of the curing bag; the outer flanges give added rigidity and greater strength to the rim as well as facilitate true alignment of the sections by reason of increased bearing surface at the hinged joints; the formation of the hinged brackets with a sub-base further thickens the bearing surface and renders the hinged joints more rigid so as to reduce lateral or radial play between the sections at the hinged joints. The rim can be collapsed about its hinges in the usual manner heretoknown after removing the pin from one of the hinges.

I claim:

1. An inside curing rim for holding a pneumatic curing bag inside a tire casing to be vulcanized, comprising, a circumferential well of lesser width than the width of the portion of the curing bag held in the rim, and a circumferential flange extended contiguously from each side of said well and curved upwardly and outwardly.

2. An inside curing rim for holding a pneumatic curing bag inside a tire casing to be vulcanized, comprising, a circumferential well of lesser width than the width of the portion of the curing bag held in the rim, and a circumferential flange extended contiguously from each side of said well and curved upwardly and outwardly beyond the opposite side planes at the maximum bag expansion in the casing by inflation to curing pressure.

3. An inside curing rim for holding a pneumatic curing bag inside a tire casing to be vulcanized, comprising, a circumferential well of arcuate cross section and of lesser width than the width of the portion of the curing bag confined in the rim well, and a circumferential flange extending outwardly and upwardly from each side of said well.

4. An inside curing rim for holding a pneumatic curing bag inside a tire casing to be vulcanized, comprising, a circumferential well of arcuate cross section and of lesser width than the width of the portion of the curing bag confined in the rim well, and a circumferential flange extending outwardly and upwardly from each side of said well, said curing rim including a plurality of complemental arcuate elements of the said cross sectional shape to form a complete circular rim, and hinged connections between the adjacent ends of the respective complemental elements, at least one of said hinge connections being releasable.

5. An inside curing rim for holding a pneumatic curing bag inside a tire casing to be vulcanized, comprising, a circumferential well of arcuate cross section and of lesser width than the width of the portion of the curing bag confined in the rim well, and a circumferential flange extending outwardly and upwardly from each side of said well, said curing rim including a plurality of complemental arcuate elements of the said cross sectional shape to form a complete circular rim, and hinged connections between the adjacent ends of the respective complemental elements, at least one of said hinge connections being releasable, the pivots of said hinge connections being in registry with and radially inwardly of the lines of abutments of the respective abutting ends of said elements.

THOMAS P. BACON, Jr.